April 30, 1940.  W. GODSTREY  2,199,199
BRAKE ASSEMBLY FOR MOTOR VEHICLES
Filed Sept. 21, 1938
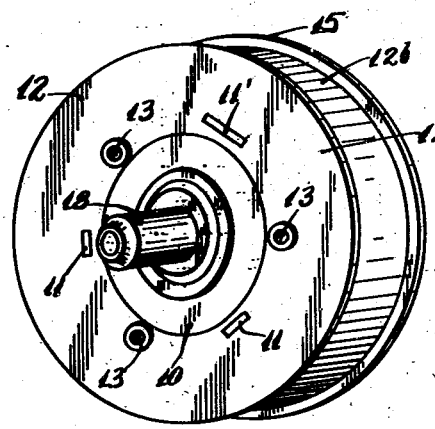
Fig. 1.
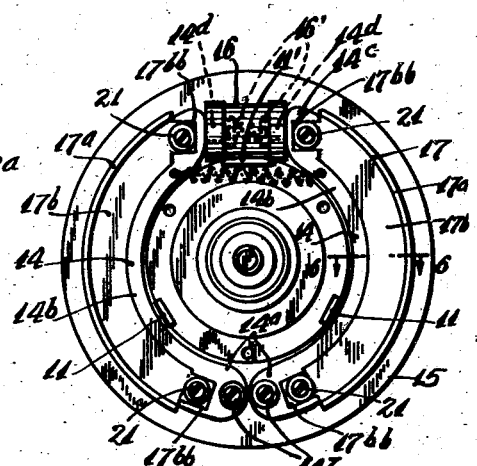
Fig. 3.
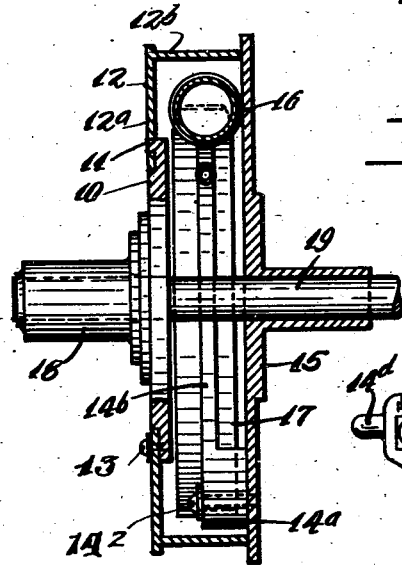
Fig. 2.
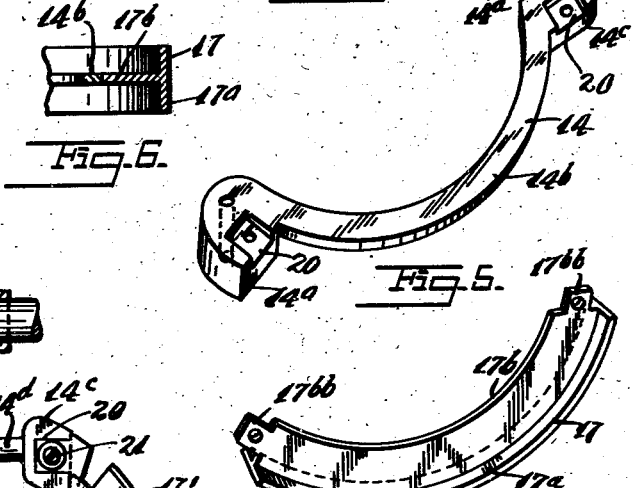
Fig. 6.
Fig. 5.
Fig. 4.
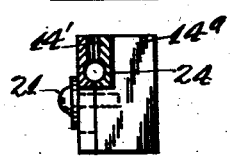
Fig. 9.
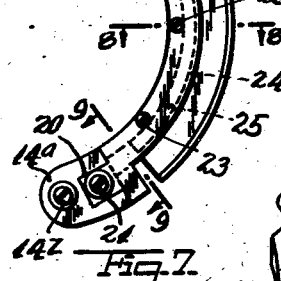
Fig. 7.
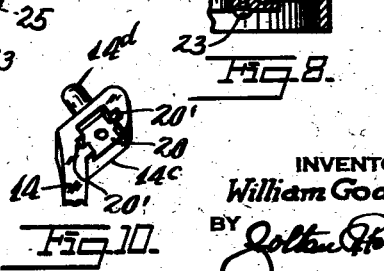
Fig. 8.
Fig. 10.
INVENTOR
William Godstrey
BY
ATTORNEY Patented Apr. 30, 1940

2,199,199

UNITED STATES PATENT OFFICE 2,199,199

BRAKE ASSEMBLY FOR MOTOR VEHICLES

William Godstrey, New York, N. Y., assignor of one-half to Harry N. Rhino, New York, N. Y.

Application September 21, 1938, Serial No. 230,933

2 Claims. (Cl. 188—246)

This invention relates to new and useful improvements in an automobile or the like brake assembly.

An object of this invention is to produce a brake assembly for all types of vehicles which may be readily separated or dismantled without removing the whole unit.

The invention proposes to so construct the brake assembly that the brake shoes may be removed from the brake arms by the removal of suitable screws arranged upon face portions of the brake shoes.

It is proposed to mount the brake shoes directly over the brake arm so that the direction of the brake action is in a direct straight line. This will prevent application of the brake shoes at undesirable angular inclinations.

Still further the invention proposes a novel way of securing the brake drum to the hub flange of the wheel. It is proposed to characterize the novel construction by the provision of several fingers or lugs mounted upon the flange and cooperative with openings on the brake drum for properly aligning and centralizing these parts and for producing a balanced relationship of the parts.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:

Fig. 1 is a perspective view of the brake assembly constructed according to this invention.

Fig. 2 is a vertical sectional view of the device shown in Fig. 1.

Fig. 3 is a front elevational view of the brake assembly with the brake drum removed.

Fig. 4 is a perspective view of one of the brake shoes.

Fig. 5 is a perspective view of one of the brake arms.

Fig. 6 is a fragmentary horizontal sectional view on the line 6—6 of Fig. 3.

Fig. 7 is a side elevational view of a brake arm and brake shoe assembly constructed according to a modification of this invention.

Fig. 8 is a horizontal sectional view taken on the line 8—8 of Fig. 7.

Fig. 9 is another sectional view taken on the line 9—9 of Fig. 7.

Fig. 10 is a fragmentary perspective view, illustrating another modification.

The brake assembly, according to this invention, may be used in connection with all types of vehicles and devices propelled by power, and includes a wheel hub flange 10 having several axially extending fingers or lugs 11, one of which, namely the lug 11', is larger than the others. A brake drum 12 has an annular end portion 12ª formed with openings for receiving the lugs or fingers 11 and 11'. Fastening elements 13 are provided for removably securing the said annular end portion and the flange 10 together.

A pair of brake arms 14 is suitably hung at one of their ends 14ª upon a stationary member 15 by pintle elements 14ˣ. Said arms are cooperative with the brake drum. A means is provided for expanding the brake arms. In the particular form of the device shown on the drawing the expanding means is of the hydraulic type and includes a hydraulic cylinder 16 interposed between the free ends of the brake arms. Brake shoes 17 for supporting brake linings which are adapted to be engaged against the brake drum are removably mounted upon the brake arms 14.

The wheel hub flange is provided with a hub portion 18 suitably mounted upon a wheel axle 19. The lugs 11 and 11' are formed upon or mounted upon peripheral portions of the hub flange 10. The brake drum 12 has a skirt portion 12ᵇ against which the brake shoes engage. The brake drum also is provided with the annular end portion 12ª which extends over an edge portion of the wheel hub flange 10. It is these overlapping portions which are connected together by the lugs 11 and 11' and by screws 13. These screws are arranged alternately between the lugs.

The screws 13 serve to hold the wheel hub flange 10 and the annular member 12ª together against possible axial displacement. Of course, the screws also hold these parts together against radial displacement. The lugs 11 working in the openings formed in the annular end portion 12ª serve to hold these parts together under radial stresses. An advantage of this construction resides in the fact that radial stresses are not directly imparted to the screws 13. In fact the parts may be so constructed that very little, if any, radial stresses are transmitted to the holding screws.

Each brake arm 14 is provided with a comparatively narrow arcuate central portion 14ᵇ. At one end of the central portion 14ᵇ there is the end portion 14ª previously referred to. This end portion is comparatively thick as may be understood by examining Figs. 2 and 5, and serves to hold the brake arm suitably distanced from the stationary member 15. At the other end of the edge central portion 14ᵇ the brake arm is provided with a comparatively wide end 14ᶜ. Stems 14ᵈ are provided at the ends 14ᶜ of each brake arm 14, which engage the usual fluid actuated pistons 16' in the hydraulic cylinder 16. Each brake shoe 17 is substantially of T-shape in transverse cross section. There is an outer transverse portion 17ᵃ upon the outer face of which the brake lining is mounted. There is also a flange portion 17ᵇ representing the stem portion of the T-shape.

The flange portion 17ᵇ is adapted to engage upon the outer edge of the arcuate central portion 14ᵇ of the brake arm. It should be noted (see Fig. 6) that these parts are not side by side, but one above the other. Therefore there will be no tendency for angular motion of the brake arms during the braking action. The ends of the flanges 17ᵇ are formed with reduced lugs 17ᵇᵇ which are adapted to engage in face recesses 20 formed in the faces of the end portions 14ᵃ and 14ᶜ of the brake arms. Screws 21 are used for holding the end portions 17ᵇᵇ fixedly to the end portions of the brake arms. The details of the construction of the hydraulic expanding cylinder will not be given in this specification since it forms no part of the invention.

The operation of the device is as follows:

When required the brake drum 12 may be easily removed from the brake assembly merely by taking out the screws 13. This is an advantage over prior constructions in which these parts were riveted together. With the new construction the brake arms and brake shoes are readily accessible.

When the brake drum 12 is removed the remaining portion of the brake assembly appears as shown in Fig. 3. When required the brake shoes 17 may easily be removed from the brake arms 14 merely by removing the screws 21. When these screws are removed the parts readily separate. The brake shoes may be relined very easily after they are removed.

The purpose of forming the lug 11' and its receiving opening of a different size than the lugs 11 and their receiving openings is that it will then be required that the brake drum be assembled in a certain relationship with the wheel hub flange. This relationship would be one in which the parts are properly balanced. The balancing is done during the manufacture. The parts must be assembled in this relationship.

In Figs. 7 and 8 a modification of the invention has been disclosed characterized by another means for securing the brake shoes upon the brake arms. According to this form of the invention each brake arm 14' is formed from a pair of adjacent lateral sections secured together by several screws 23. These screws pass through openings in one of the sections and threadedly engage the other of the sections. An internal arcuate groove 24 is formed inwards from the adjacent edges of these lateral sections. This groove is shown circular in transverse cross section.

Each brake shoe 17' is of T-shape in transverse cross section, the head portion of which is adapted to receive the brake lining, while the stem portion is provided with an enlarged bead 25 adapted to engage the groove 24. One of the sections of the brake arm 14' is provided with the enlarged ends 14ᵃ and 14ᶜ corresponding with the similar parts in the preferred form of the device. Screws 21 are provided for removably holding the lateral sections of the brake arm together. In order to remove the brake shoe from the brake arm it is necessary that the screws 23 and the screws 21 be loosened so that the lateral sections may be separated enough to permit the enlarged bead portion 25 to be removed from the groove 24.

A further feature of the construction resides in the fact that each of the brake shoes 17' may be circumferentially adjusted, that is, moved to different circumferential positions upon the brake arm and be secured in the new position by the tightening of the screws 23 and 21.

In other respects this form of the invention is similar to the previous form and similar parts may be identified by corresponding reference numerals.

In Fig. 10 the recess 20 is illustrated with branch recesses 20' to better distribute the strain.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. In an automobile brake assembly, brake arms suitably hung at one of their ends, means for expanding said brake arms, and brake shoes for brake linings removably mounted on said arms, each of said brake arms being formed of lateral sections secured together, an internal arcuate groove formed inwards from the ends of said sections, and the brake shoes having stem portions with beaded ends for engaging tightly in said grooves.

2. In an automobile brake assembly, brake arms suitably hung at one of their ends, means for expanding said brake arms, and brake shoes for brake linings removably mounted on said arms, each of said brake arms being formed of lateral sections secured together, an internal arcuate groove formed inwards from the ends of said sections, and the brake shoes having stem portions with beaded ends for engaging tightly in said grooves, and fastening elements for assisting in securing the lateral sections of the brake arms together.

WILLIAM GODSTREY.